United States Patent
Schoenherr et al.

(10) Patent No.: US 9,457,303 B2
(45) Date of Patent: Oct. 4, 2016

(54) PARTICLE SEPARATOR FOR AN AIR CONDUIT, AIR DISTRIBUTION SYSTEM, USE OF A PARTICLE SEPARATOR AND AIRCRAFT

(71) Applicants: AIRBUS OPERATIONS GMBH, Hamburg (DE); DIEHL AIRCABIN GMBH, Laupheim (DE)

(72) Inventors: Ralph Schoenherr, Hamburg (DE); Marc Ahlburg, Meckenheim (DE); Stefan Ertl, Hamburg (DE); Ivo Schindler, Dresden (DE); Marco Hinz, Timmendorfer Strand (DE); Dariusz Krakowski, Hamburg (DE); Alfred Huber, Maselheim-Aepfingen (DE); Ingo Hildebrand, Laupheim (DE)

(73) Assignees: AIRBUS OPERATIONS GMBH, Hamburg (DE); DIEHL AIRCABIN GMBH, Laupheim (DE)

( * ) Notice: Subject to any disclaimer, the term of this patent is extended or adjusted under 35 U.S.C. 154(b) by 281 days.

(21) Appl. No.: 13/945,972

(22) Filed: Jul. 19, 2013

(65) Prior Publication Data

US 2014/0020347 A1    Jan. 23, 2014

Related U.S. Application Data

(60) Provisional application No. 61/673,309, filed on Jul. 19, 2012.

(30) Foreign Application Priority Data

Jul. 19, 2012  (DE) .................... 10 2012 014 309

(51) Int. Cl.
*B01D 45/08* (2006.01)
*B01D 45/12* (2006.01)

(52) U.S. Cl.
CPC ............... *B01D 45/08* (2013.01); *B01D 45/12* (2013.01)

(58) Field of Classification Search
CPC .............................. B01D 45/08; B01D 45/12
See application file for complete search history.

(56) References Cited

U.S. PATENT DOCUMENTS

| | | | | |
|---|---|---|---|---|
| 4,545,792 A | * | 10/1985 | Huttlin ........................... | 96/320 |
| 4,802,901 A | * | 2/1989 | Wurz et al. .................... | 55/440 |
| 5,665,130 A | * | 9/1997 | Nielsen et al. ................. | 55/307 |

(Continued)

FOREIGN PATENT DOCUMENTS

| | | |
|---|---|---|
| DE | 2114721 A1 | 9/1972 |
| DE | 102006039647 A1 | 3/2008 |
| JP | 2006046089 A | 2/2006 |

OTHER PUBLICATIONS

German Searching Authority, German Search Report for DE 10 2012 014 309.5 Mailed Jan. 31, 2013.

*Primary Examiner* — Amber R Orlando
*Assistant Examiner* — Britanny Precht
(74) *Attorney, Agent, or Firm* — Lorenz & Kopf, LLP.

(57) ABSTRACT

A particle separator comprises a pipeline that allows a fluid to flow in a curved direction of flow. The particle separator includes an inlet region, a curved deflection region, which in the direction of flow follows on from the inlet region, with an inside wall and an outside wall, and a delimitation body. The delimitation body at least in some sections extends between the inside wall and the outside wall in the interior of the deflection region and is curved in the same direction as the deflection region.

18 Claims, 2 Drawing Sheets

(56) References Cited

U.S. PATENT DOCUMENTS

| | | |
|---|---|---|
| 6,315,804 B1* | 11/2001 | Bradley .................. 55/440 |
| 8,038,755 B2 | 10/2011 | Katefidis |
| 8,394,163 B2 | 3/2013 | Hildebrand et al. |
| 2008/0028935 A1* | 2/2008 | Andersson .................. 95/272 |
| 2011/0021129 A1 | 1/2011 | Gundlach |
| 2011/0138758 A1* | 6/2011 | Hildebrand et al. ............ 55/440 |
| 2012/0131891 A1 | 5/2012 | Nishiura et al. |

* cited by examiner

PARTICLE SEPARATOR FOR AN AIR CONDUIT, AIR DISTRIBUTION SYSTEM, USE OF A PARTICLE SEPARATOR AND AIRCRAFT

CROSS-REFERENCE TO RELATED APPLICATIONS

This application claims priority to German Patent Application No. 10 2012 014 309.5, filed Jul. 19, 2012 and to U.S. Provisional Patent Application No. 61/673,309, filed Jul. 19, 2012, which are each incorporated herein by reference in their entirety.

TECHNICAL FIELD

The technical field relates to a particle separator for an air conduit, to an air distribution system in an aircraft, to the use of a particle separator, and to an aircraft comprising at least one air conduit and a particle separator.

BACKGROUND

For the provision of a climate on board a commercial aircraft, which climate is agreeable to passengers, usually an air conditioning system is used that guides conditioned air through a multitude of air outlets to a passenger cabin. In certain operating cases in which relatively high outside temperatures and a high atmospheric humidity of the ambient air are to be managed, air conditioning packs may emit ice that collects in adjoining pipes of an air distribution system. In order to prevent pressure losses in the pipes, commonly the ice is cyclically defrosted, wherein larger ice accumulation may become detached from the pipes. When impacting downstream pipe walls this ice accumulation disintegrates into smaller pieces and at times may find its way as ice particles through air outlets into the passenger cabin. The size of such ice particles approximately may compare to that of hail.

In the state of the art the use of mesh-shaped or bouffant retaining elements in an air distribution system is known, which results in pressure losses. However, since the size distribution of the ice particles is relatively random, it may also be possible for ice particles in part to pass through mesh-shaped retaining elements or to at least in part block their openings.

DE 2 114 721 discloses a device for separating particles from a gas flow with a flow mesh comprising several duct walls, arranged side by side, and comprising collection channels, which are open towards the direction of flow, for leading away separated particles, wherein the radius of curvature and/or the distance between respectively adjacent duct walls gradually decrease/decreases in the direction of flow.

DE 10 2006 039 647 A1 discloses a particle separator with an inlet for an airstream comprising particles, with an S-shaped deflection and a deflector surface arranged underneath it, which the particles contained in a gas stream impact as a result of gravity and are led away.

DE 10 2009 034 410 A1 discloses an ice separator for an air conduit comprising a curved air-directing surface and a collection pocket, arranged downstream, into which the ice particles find their way, as a result of their inertial force, from an airstream flowing from the ice separator.

Other objects, desirable features and characteristics will become apparent from the subsequent summary and detailed description, and the appended claims, taken in conjunction with the accompanying drawings and this background.

SUMMARY

According to various embodiments, a device for preventing the passage of ice particles from an air conditioning system to a passenger cabin of an aircraft is provided, which device is as simple as possible mechanically and as lightweight as possible, and as reliably as possible retains ice particles of any size, without however increasing the flow resistance of an air conduit or of a respective air outlet.

The particle separator according to the various teachings of the present disclosure comprises a pipeline that allows a fluid to flow in a curved direction of flow, comprising an inlet region, a curved deflection region, which in the direction of flow follows on from the inlet region, with an inside wall and an outside wall, and a delimitation body which at least in some sections extends between the inside wall and the outside wall in the interior of the deflection region and is curved in the same direction as the deflection region, wherein the delimitation body in the direction of flow is curved to a lesser extent than the outside wall so that between the delimitation body and the outside wall a pocket for collecting particles forms, which pocket is open towards the inlet region and which tapers off in the direction of flow.

Forces act on particles, for example ice particles, in an airstream as a result of practically unavoidable particle/wall area collisions within a pipeline, as a result of flow resistance, and as a result of gravitation that in their totality determine the trajectory of the particles within the airstream. Apart from translatory components a certain particle rotation, and from this a Magnus force that acts as a transverse force, results from the forces. The arrangement of the particles in a flow cross section is thus subject to a particular stochastic distribution.

The inlet region of the pipeline in the form of in one example, a straight pipe section may largely stabilize particle distribution so that a uniform straight flight movement of the particles results. Surprisingly, simulations have shown that in a pipe that is arranged horizontally and that is of adequate length, because of the dominating gravitation at a flow speed of for example about 20 m/s ice particles predominantly stochastically distribute in the lower half of the cross section of the pipeline. Corresponding means for effectively separating the particles may thus concentrate on this lower half.

As a result of its curvature, the deflection region that follows on results in deflection of the airstream. As a result of their density, which is considerably higher than that of the flowing air, the particles are unable to follow the gas flow immediately at the beginning of the curvature. They are thus intent on remaining in the state of a straight and uniform movement, and in this process predominantly impact the outside wall that acts as a separation area or collection area. In this arrangement the outside wall is to be interpreted as an area, situated on the inside of the separator, of a delimitation on the outside of the curvature of the separator. Analogously to this, the inside wall is to be interpreted as an area, situated on the inside of the separator, of a delimitation on the inside of the curvature of the separator.

The curvature of the deflection region, for example around at least one first center of curvature, may be designed as is customary for pipe bends in the state of art. In this arrangement the curvature may comprise a constant radius of curvature or it may comprise a variable curvature. In the latter case several first centers of curvature may be provided.

The progression of the curvature is substantially continuous, wherein the curvature may increase, remain constant, or decrease.

The delimitation body, which is arranged in the pipeline and is also curved, exploits the inertia behavior of the particles in that by means of an inlet edge it is spaced apart from the outside wall of the deflection region, thus forming a pocket-like interception space between the outside wall and the delimitation body, in which interception space particles collect. From there they may no longer exit into the free airstream when an outlet edge of the delimitation body rests at least in part against the separation area or as a result of a small spacing blocks the downstream path of the particles. If the outlet edge of the delimitation body in part does not rest against the outside wall, a retention mesh may be provided that closes a gap between the outlet edge of the delimitation body and the outside wall.

Since, furthermore, during normal operation of an air distribution system there is always an airstream between the inlet edge and the outside wall, any escape of the particles upstream may be rendered difficult or may be prevented entirely. The trapped particles correspondingly need to remain in the interception space. For the purpose of forming a tapering-off pocket, the curvature of the delimitation body is less than the curvature of the deflection region and can, for example, take place around at least one second center of curvature, wherein the curvature may likewise comprise a constant radius of curvature or a variable radius of curvature. In this arrangement the delimitation body qualitatively follows the curvature of the deflection region and in addition in its progression from the inlet edge to the outlet edge draws nearer to the outside wall.

The separation efficiency may be improved in that the inlet region is straight at least in some regions and is horizontally installed in the aircraft in question so that good stochastic distribution of the ice particles in the lower half of the pipeline cross section results. The extent of the curvature of the deflection region depends on the particular purpose of application; however it may correspond to the curvature of customary deflection regions.

The delimitation body may be made by means of a fiber-reinforced plastic, for example from GRP, CRP or a material comprising Kevlar, in order to achieve a low weight.

Furthermore, the inlet edge may comprise an aerodynamically optimized, and in particular rounded, profile in which flow-induced sounds are minimized, as is flow resistance. Furthermore, the delimitation body may be implemented as an integral component or as a frame that is covered by a fabric, wherein the frame may be affixed in the pipeline for example by means of bonding or screwing. In this manner a particularly weight-saving design may be implemented.

By means of a mechanically very simple design with a delimitation body as explained above, a particularly economical but nevertheless very effective particle separator may be provided.

In one examplary embodiment the delimitation body is permeable to air at least in some regions. This can, for example, be implemented by a fine-mesh net-like material that is stretched on a not necessarily air-permeable frame or the like. This makes it possible for the flow to pass at least in some sections through the delimitation body, while the particles reach the space between the delimitation body and the outside wall. The force acting on the delimitation body may thus be significantly limited, and the efficiency of the particle separator may be significantly improved.

In one embodiment, the delimitation body extends in the direction of flow, starting from the transition between the inlet region and the deflection region. This makes it possible to achieve particularly effective separation of the phases of the two-phase flow comprising air and particles, because a calmed and uniform form of flow may directly act on the delimitation body. Because of the resulting limited size of the delimitation body it is possible to avoid excessive material use and thus excessive weight in relation to the particle separator, wherein nonetheless a very effective separation result is achieved.

In another exemplary embodiment, the delimitation body in the downstream direction closes off with the outside wall the pocket for collecting particles. In this manner it is possible to completely prevent any particles located between the delimitation body and the outside wall from reaching the downstream airstream.

One embodiment further comprises at least one particle reflection body, wherein the at least one particle reflection body is arranged on an inside wall of the inlet region, wherein the inside wall of the inlet region makes a transition to the inside wall of the deflection region, and the particle reflection body is designed to deflect impinging particles into the pocket. If despite a for example stochastic distribution of the particles in one half of the pipeline cross section, which half faces away from the particle reflection body, occasionally some particles are present in the half of the pipeline cross section, which half faces towards the particle reflection body, said particles, by impinging the particle reflection body, may be thrown back into the other half.

In this arrangement the reflection body may generally be implemented as a bulge which when impacted by a particle, enables said particle to bounce off. In order to achieve a continuous bouncing-off angle range the bulge may comprise a curved shape. In this arrangement, the curvature may be around an axis that is situated substantially perpendicularly on a plane delimited by the direction of movement of the deflection region and of the inlet region. By means of a suitable adjustment of the curvature of the reflection body, particular regions of the pipe cross section may be impinged in preference by particles.

In another embodiment the reflection body may comprise several bulges that are arranged one behind the other in the direction of flow, which elevations project into the interior of the pipeline. Said bulges could, in each case, comprise a cross section in the form of a segment of a circle. In this embodiment, such an arrangement of reflection bodies may extend to a transition between the inlet region and the deflection region and can, for example, comprise about two to about ten individual reflection bodies that are interconnected so as to be flush.

In one exemplary embodiment, the bulges are of a bead-like design. In this arrangement the bulge is elongated and comprises a round or rounded cross section, as well as, optionally, constrictions that are distributed along the length of the bulge and that are spaced apart from each other.

Another exemplary embodiment further comprises a drain that is arranged in a transition region between the inlet region and the outside wall of the deflection region. In this manner it is possible to lead away, for example, the condensate resulting during the melting of trapped ice particles, which makes it possible to continuously or subsequently empty the interception space between the delimitation body and the outside wall. In this arrangement, the drain can, for example, be designed as an opening in the direction of the force of gravity of the installed separator, or as a hose connection.

In one embodiment, the cross section of the delimitation surface, at least in some sections, is curved in the same direction as the outside wall, except at a lesser curvature. Accordingly, the delimitation surface comprises a channel-like shape whose concave surface follows the direction of flow. In this arrangement the direction of flow corresponds to a direction of flow of the pipeline, and could essentially be a connecting line of center points of subsequent pipe cross sections. Consequently the pocket or the interception space between the delimitation body and the separation area is designed so as to be falcate or crescent-shaped at least in some sections. Apart from a particularly advantageous separation performance, a largely uninfluenced airstream is also possible.

For efficient separation, the delimitation body may extend along the entire deflection region so that in one embodiment an opening of the pocket is situated in a transition between the inlet region and the deflection region or further upstream.

The present disclosure further relates to an air distribution system for an aircraft, comprising at least one air conduit, wherein the particle separator according to the present teachings is integrated as an ice separator in the air conduit. In one exemplary embodiment, the inlet region of the particle separator integrated in the air conduit is at least in some sections horizontally integrated in the aircraft. Part of the air conduit is thus formed by the particle separator itself.

Furthermore, the present disclosure also relates to the use of a particle separator exemplified above in an air conduit of an aircraft.

Finally, the present disclosure also relates to an aircraft comprising at least one air conditioning system that comprises at least one air conditioning pack, at least one mixing chamber for mixing air from a cabin of the aircraft with fresh air, and at least one air distribution system with at least one air conduit, wherein at least one particle separator described above is integrated in the at least one air conduit. In one example, the inlet region of the integrated particle separator is arranged substantially horizontally.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
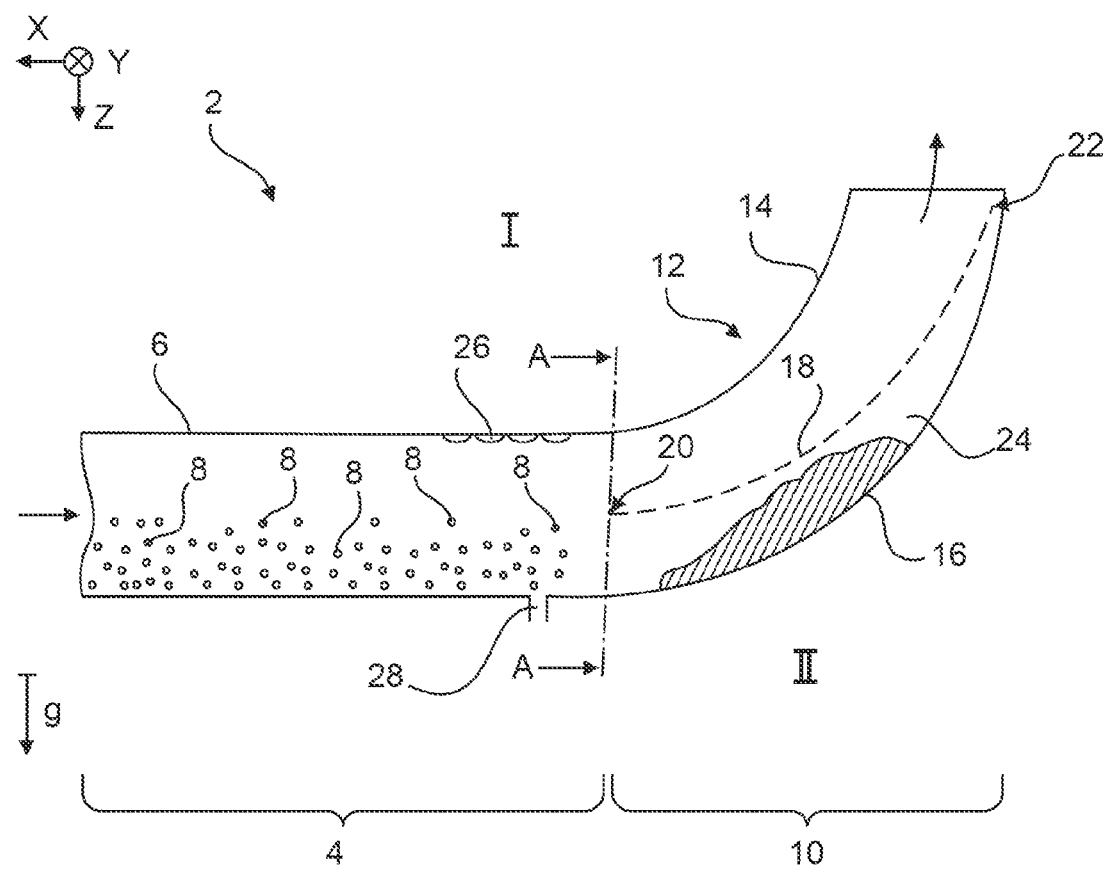
FIG. 1 shows a section view of a particle separator according to the various teachings of the present disclosure.

FIG. 1 shows a section view of an exemplary embodiment of a particle separator 2. As an example, a coordinate system is shown whose X-axis points to the left-hand side, whose Y-axis extends into the drawing plane, and whose Z-axis points downwards in the drawing plane. As an example, the force of gravity, designated by an arrow designating gravitational acceleration g, extends parallel to the Z-axis.

The particle separator 2 comprises an inlet region 4 that is, for example, formed by a straight pipeline segment 6. The inlet region 4 receives a two-phase flow comprising air and particles, in particular ice particles 8, which in the drawing plane flow from the left-hand side parallel to the X-axis into the inlet region 4. The axial extension of the inlet region 4 in the X-direction should generally be selected in such a manner that within the straight pipeline segment 6 an orderly two-phase flow results in which the ice particles 8 are distributed as stochastically as possible in the lower half of the pipeline cross section. This is on condition that the inlet region 4 is horizontally aligned and that gravity acts on the ice particles 8.

Downstream of the inlet region 4 a deflection region 10 follows that is formed by a curved pipeline segment 12. In the exemplary illustration the center axis of the pipe is pivoted upwards by about 90° on the Y-axis in the drawing plane. Because of their inertia due to mass, the ice particles 8 flowing on the curved pipeline section endeavor to maintain a uniform straight movement, and consequently they cannot completely and immediately follow the deflected airstream.

The curved pipeline segment 12 is curved, as an example, on a first center of curvature (not shown in the drawing) on a first side I of the particle separator 2 that is situated above the transition between the inlet region 4 and the deflection region 10. Accordingly, the first side I is an interior region of the curvature, wherein a delimitation that points towards the first side I of the curved pipeline segment 12 is an inside wall 14. If a non-constant curvature is desired, further first centers of curvature exist which in each case are responsible for a local curvature.

An outside wall 16 of the curved pipeline segment, which outside wall 16 is opposite the inside wall 14, acts as a separation area that is situated on a second side II of the particle separator 2. Due to its inertia the ice particles 8 are forced onto the outside wall 16 where they impact and collect. Onward transport of the accumulated ice particles 8 in the direction of flow is prevented by a delimitation body 18 that is arranged in the curved pipeline segment 12.

The delimitation body 18 is, for example, curved on at least one second center of curvature. In this arrangement the curvature follows the direction of curvature of the deflection region 10, wherein, however, a downstream inlet edge 20 is spaced apart from the separation area 16, and an outlet edge 22 is provided that is arranged opposite the inlet edge 20 and that at least in part contacts the outside wall 16. This results in a tapering pocket 24 or in a collection chamber in which all the ice particles 8 are trapped. Thus, if the curved pipeline segment 12 has a constant curvature, the curvature of the delimitation body 18 could have a curvature that is ellipsoid at least in some sections. As explained above, it is also possible for several second centers of curvature 15 to exist if the delimitation body 18 does not have a constant curvature.

In order to improve the stochastic distribution of the ice particles 8 in the lower half of the pipeline cross section of the inlet region 4, at least one reflection body 26 and, for example, an arrangement comprising several reflection bodies 26 may be used to cause a reflection of ice particles 8 deep into the cross section of the inlet region 4 or of the deflection region 10. In this manner the separation of ice particles 8 may be further improved.

The ice particles 8 collected in the pocket 24 may be melted as a result of the effect of the ambient temperature of the particle separator 2 and as a result of the airstream that carries said ice particles 8. Consequently, water will collect on the outside wall 16 and, following gravitation, will, for example, flow in the direction of the inlet region 4, provided the curvature of the deflection section 10 extends opposite to the gravitational acceleration g, and provided the inlet region 4 is horizontally held. In a transition region between the inlet region 4 and the deflection region 10 there is a drain 28 that allows gravity-induced exiting or drainage of melt water.

The melt water may drip directly into a region situated below, and in the application in an aircraft may collect in a bilge. In addition, in order to protect electrical lines or other lines or conduits, melted water can, at least over short distances, be led, by means of silicon hoses or the like, to regions situated below.

Figure 1A:
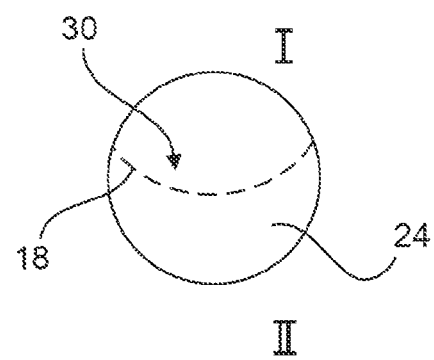
FIG. 1A is a cross-sectional view of the particle separator of FIG. 1, taken along line A-A of FIG. 1.

The section view A-A of FIG. 1A furthermore shows a spatial design of the delimitation body 18 that comprises a curvature not only on the Y-axis but also on the X-axis. This results in a channel shape with a channel 30 that extends as a depression along the direction of movement of the particle separator 2 to the outside wall 16. If a circular cross section of the two pipeline segments 6 and 12 is assumed, in this manner a particularly good approach of the outlet edge 22 of the delimitation body 18 towards the outside wall 16 may be achieved and discontinuities and higher flow resistance resulting from this may be avoided.

Figure 2:
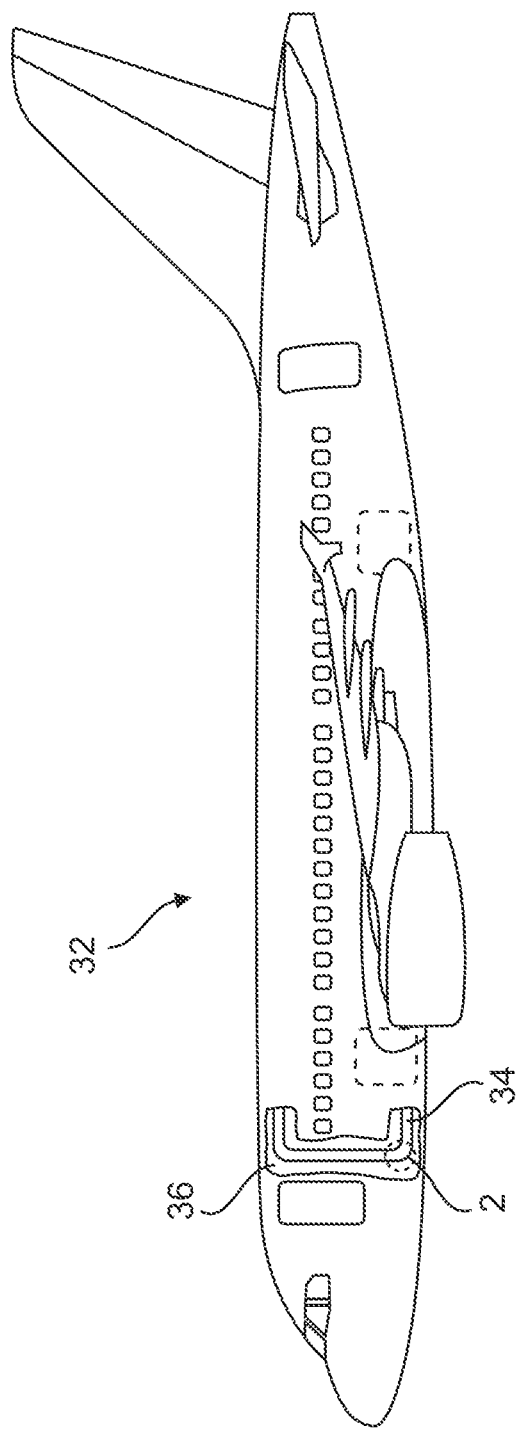
FIG. 2 shows an aircraft comprising an air distribution system and at least one particle separator.

FIG. 2 shows a lateral view with a partial section view of an aircraft 32. The aircraft 32 comprises an air distribution system with air conduits 34 that lead air from a mixer unit to air outlets in a passenger cabin 36. In that location at least one particle separator 2 according to the various teachings of the present disclosure may be integrated, wherein in one example, the inlet region 4 of a particle separator 2 is aligned so as to be substantially horizontal, i.e. substantially parallel to an X-axis of the aircraft 32 in order to achieve a stochastic distribution of the ice particles 8 in the lower half of the pipeline cross section.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A particle separator, including a pipeline that allows a fluid to flow in a curved direction of flow, the pipeline comprising:
    an inlet region;
    a curved deflection region, which in the direction of flow follows on from the inlet region, with an inside wall and an outside wall;
    a plurality of particle reflection bodies; and
    a delimitation body which at least in some sections extends between the inside wall and the outside wall in the interior of the deflection region and is curved in the same direction as the deflection region,
    wherein the delimitation body in the direction of flow is curved to a lesser extent than the outside wall so that between the delimitation body and the outside wall a pocket for collecting particles forms, which pocket is open towards the inlet region and which tapers off in the direction of flow, and
    wherein the particle reflection bodies are arranged directly and only on an inside wall of the inlet region, the inside wall of the inlet region makes a transition to the inside wall of the deflection region, and the particle reflection bodies are designed to deflect impinging particles into the pocket.

2. The particle separator of claim 1,
    wherein the delimitation body is permeable to air at least in some regions.

3. The particle separator of claim 1, wherein the delimitation body extends in the direction of flow, starting from the transition between the inlet region and the deflection region.

4. The particle separator of claim 1, wherein the delimitation body in the downstream direction closes off with the outside wall the pocket for collecting particles.

5. The particle separator of claim 1, wherein the particle reflection bodies comprise a plurality of bulges that are arranged one behind the other in the direction of flow, and each of the plurality of bulges include an elevation that projects into the interior of the pipeline.

6. The particle separator of claim 5, wherein the plurality of bulges are of a bead-like design.

7. The particle separator of claim 1, further comprising:
    a drain that is arranged in a transition region between the inlet region and the outside wall of the deflection region.

8. The particle separator of claim 1,
    wherein the cross section of the delimitation body, at least in some sections, is curved in the same direction as the outside wall of the deflection region, except at a lesser curvature than the outside wall.

9. The particle separator of claim 8, wherein the cross section of the pocket at least in some sections is crescent-shaped.

10. The particle separator of claim 1, wherein the delimitation body extends along the entire deflection region.

11. The particle separator of claim 1, wherein an opening of the pocket is situated in a transition between the inlet region and the deflection region or further upstream.

12. An air distribution system for an aircraft, comprising:
    at least one air conduit;
    at least one particle separator integrated as an ice separator in the at least one air conduit, the at least one particle separator including a pipeline comprising:
    an inlet region a curved deflection region, which in the direction of flow follows on from the inlet region, with an inside wall and an outside wall;
    a plurality of particle reflection bodies; and
    a delimitation body which at least in some sections extends between the inside wall and the outside wall in the interior of the deflection region and is curved in the same direction as the deflection region,
    wherein the delimitation body in the direction of flow is curved to a lesser extent than the outside wall so that between the delimitation body and the outside wall a pocket for collecting particles forms, which pocket is open towards the inlet region and which tapers off in the direction of flow, and wherein the particle reflection bodies arranged directly and only on an inside wall of the inlet region, the inside wall of the inlet region makes a transition to the inside wall of the deflection region, and the particle reflection bodies are designed to deflect impinging particles into the pocket.

13. An aircraft, comprising:
an air distribution system including at least one air conduit for directing air from a mixer unit to at least one air outlet in a passenger cabin of the aircraft;
at least one particle separator integrated as an ice separator in the at least one air conduit, the at least one particle separator including a pipeline comprising:
an inlet region a curved deflection region, which in the direction of flow follows on from the inlet region, with an inside wall and an outside wall;
a plurality of particle reflection bodies; and
a delimitation body which at least in some sections extends between the inside wall and the outside wall in the interior of the deflection region and is curved in the same direction as the deflection region,
wherein the delimitation body in the direction of flow is curved to a lesser extent than the outside wall so that between the delimitation body and the outside wall a pocket for collecting particles forms, which pocket is open towards the inlet region and which tapers off in the direction of flow, and wherein the particle reflection bodies arranged directly and only on an inside wall of the inlet region, the inside wall of the inlet region makes a transition to the inside wall of the deflection region, and the particle reflection bodies are designed to deflect impinging particles into the pocket.

14. The aircraft of claim 13, wherein the delimitation body is permeable to air at least in some regions.

15. The aircraft of claim 13, wherein the delimitation body extends in the direction of flow, starting from the transition between the inlet region and the deflection region.

16. The aircraft of claim 13, wherein the delimitation body in the downstream direction closes off with the outside wall the pocket for collecting particles.

17. The aircraft of claim 13, wherein the particle reflection bodies comprise a plurality of bulges that are arranged one behind the other in the direction of flow, and each of the plurality of bulges include an elevation that projects into the interior of the pipeline.

18. The aircraft of claim 17, wherein the plurality of bulges are of a bead-like design.

* * * * *